United States Patent
McCann et al.

(10) Patent No.: US 11,699,250 B1
(45) Date of Patent: Jul. 11, 2023

(54) SYSTEM AND METHOD FOR LOW VISIBILITY DRIVING

(71) Applicant: GM Global Technology Operations LLC, Detroit, MI (US)

(72) Inventors: Morgan Lee McCann, Royal Oak, MI (US); Joseph F. Szczerba, Grand Blanc, MI (US); John P. Weiss, Shelby Township, MI (US); Kai-Han Chang, Sterling Heights, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/862,859

(22) Filed: Jul. 12, 2022

(51) Int. Cl.
| | | |
|---|---|---|
| *G06T 11/00* | (2006.01) | |
| *H04N 9/31* | (2006.01) | |
| *G06V 20/58* | (2022.01) | |
| *B60K 37/00* | (2006.01) | |
| *G02B 27/01* | (2006.01) | |
| *G06F 3/01* | (2006.01) | |
| *G06V 10/58* | (2022.01) | |

(52) U.S. Cl.
CPC ............. *G06T 11/00* (2013.01); *B60K 37/00* (2013.01); *G02B 27/0101* (2013.01); *G02B 27/0179* (2013.01); *G06F 3/013* (2013.01); *G06V 10/58* (2022.01); *G06V 20/58* (2022.01); *H04N 9/3135* (2013.01); *B60K 2370/1529* (2019.05); *B60K 2370/177* (2019.05); *B60K 2370/21* (2019.05); *G02B 2027/014* (2013.01); *G02B 2027/0138* (2013.01); *G02B 2027/0141* (2013.01); *G02B 2027/0181* (2013.01); *G06T 2210/12* (2013.01)

(58) Field of Classification Search
CPC ..... G06T 11/00; G06T 2210/12; B60K 37/00; B60K 2370/1529; B60K 2370/177; B60K 2370/21; G02B 27/0101; G02B 27/0179; G02B 2027/0138; G02B 2027/014; G02B 2027/0141; G02B 2027/0181; G06F 3/013; G06V 10/58; G06V 20/58; H04N 9/3135
See application file for complete search history.

(56) References Cited

U.S. PATENT DOCUMENTS

| | | | |
|---|---|---|---|
| 11,169,377 B1* | 11/2021 | Chen | G02B 27/0101 |
| 2016/0082840 A1* | 3/2016 | Yoshida | B60Q 9/008 |
| | | | 701/36 |
| 2018/0031384 A1* | 2/2018 | Lee | G01C 21/365 |
| 2018/0165838 A1* | 6/2018 | Ganesh | G06T 19/00 |
| 2020/0258478 A1* | 8/2020 | Mourou | G09G 5/36 |
| 2021/0316662 A1* | 10/2021 | Matajira | B60R 1/00 |

\* cited by examiner

*Primary Examiner* — Brent D Castiaux
(74) *Attorney, Agent, or Firm* — Vivacqua Crane PLLC

(57) ABSTRACT

A method for low visibility driving includes receiving image data from a visible-light camera. The image data includes an image of an area in front of a vehicle. The method includes receiving sensor data from an object-detecting sensor. The object-detecting sensor is configured to detect an object in front of the vehicle. The sensor data includes information about the object in front of the vehicle. The method further includes detecting the object in front of the vehicle using the sensor data received from the object-detecting sensor and determining whether the visible-light camera is unable to detect the object in front of the vehicle that was detected by the object-detecting sensor. The method further includes commanding a display to generate a virtual image using the sensor data to identify the object in front of the vehicle.

20 Claims, 6 Drawing Sheets

SYSTEM AND METHOD FOR LOW VISIBILITY DRIVING

INTRODUCTION

The present disclosure relates to a system and method for low visibility driving.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Sometimes, vehicles are driven in low visibility conditions (e.g., fog, rain, snow, and at night). When driving in low visibility conditions, the visible-light cameras of the vehicle may not detect objects in front of the vehicle, such as animals or pedestrians. However, it is desirable to detect objects in front of the vehicle. For this reason, it is useful to develop a method and system for displaying virtual images to highlight the presence and location of objects (e.g., animals or pedestrians) that are not evident to the vehicle user during low visibility conditions (e.g., fog, rain, snow, and at night).

SUMMARY

The present disclose describes a method and system for displaying virtual images to highlight the presence and location of objects (e.g., animals or pedestrians) that are not evident to the vehicle user during low visibility conditions (e.g., fog, rain, snow, and at night). In aspect of the present disclosure, the method for low visibility driving includes receiving image data from a visible-light camera. The image data includes an image of an area in front of a vehicle. The method includes receiving sensor data from an object-detecting sensor. The object-detecting sensor is configured to detect an object in front of the vehicle. The sensor data includes information about the object in front of the vehicle. The method includes detecting the object in front of the vehicle using the sensor data received from the object-detecting sensor and determining whether the visible-light camera is unable to detect the object in front of the vehicle that was detected by the object-detecting sensor. The method further includes, in response to determining that the visible-light camera is unable to detect the object in front of the vehicle that was detected by the object-detecting sensor, commanding a display to generate a virtual image using the sensor data to identify the object in front of the vehicle.

In aspect of the present disclosure, determining whether the visible-light camera is unable to detect the object in front of the vehicle includes determining a confidence level that the visible-light camera detected the object in front of the vehicle that was detected by the object-detecting sensor; comparing the confidence level with a predetermined threshold to determine whether the confidence level is equal to or less than the predetermined threshold, and in response to determining that the confidence level is equal to or less than the predetermined threshold, commanding the display to generate the virtual image using the sensor data received from the object-detecting sensor to identify the object in front of the vehicle.

In aspect of the present disclosure, the method further includes, in response to determining that the confidence level is greater than the predetermined threshold, refraining from generating the virtual image to identify the object in front of the vehicle.

In aspect of the present disclosure, the object-detecting sensor is a thermal imaging camera configured to generate a thermal image of the area in front of the vehicle. The method further includes cropping the thermal image of the area in front of the vehicle to generate a cropped thermal image. The method further includes commanding the display to present the cropped thermal image. The cropped thermal image solely includes a thermal image of the object in front of the vehicle to highlight the location of the object in front of the vehicle.

In aspect of the present disclosure, the virtual image includes a rectangle surrounding an entirety of the cropped thermal image to highlight the location of the object in front of the vehicle.

In aspect of the present disclosure, the virtual image further includes an arrow adjacent to the rectangle to indicate a moving direction of the object in front of the vehicle.

In aspect of the present disclosure, the object-detecting sensor is a night-vision device configured to generate a night-vision image of the area in front of the vehicle. The method further includes cropping the night-vision image of the area in front of the vehicle to generate a cropped night-vision image. The method further includes commanding the display to present the cropped night-vision image. The cropped night-vision image solely includes a night-vision image of the object in front of the vehicle to highlight the location of the object in front of the vehicle. The virtual image includes a rectangle surrounding an entirety of the cropped thermal image. The virtual image includes an arrow adjacent to the rectangle to indicate a moving direction of the object in front of the vehicle.

In aspect of the present disclosure, the method further includes determining a location of eyes of a vehicle operator of the vehicle, determining a location of the object in front of the vehicle, and determining a location of the virtual image based on the location of the eyes of the vehicle operator and the location of the object in front of the vehicle.

In aspect of the present disclosure, commanding the display to generate the virtual image to identify the object in front of the vehicle includes generating the virtual image at the previously determined location of the virtual image.

In aspect of the present disclosure, the display is an augmented reality head-up display.

In aspect of the present disclosure, the display is part of a hybrid augmented reality (AR) head-up display (HUD) system. The vehicle includes a windshield. The windshield includes a polyvinyl butyral layer and RGB phosphors embedded in the polyvinyl butyral layer of the windshield. The hybrid AR HUD system includes a projector configured to emit a laser toward the windshield to cause fluorescence of the RGB phosphors.

In aspect of the present disclosure, the vehicle includes a display and a plurality of sensors. The plurality of sensors includes a visible-light camera and an object-detecting sensor. The object-detecting sensor is configured to detect an object in front of the vehicle. The vehicle includes a controller in communication with the plurality of sensors and the display. The controller is configured to execute the method as described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
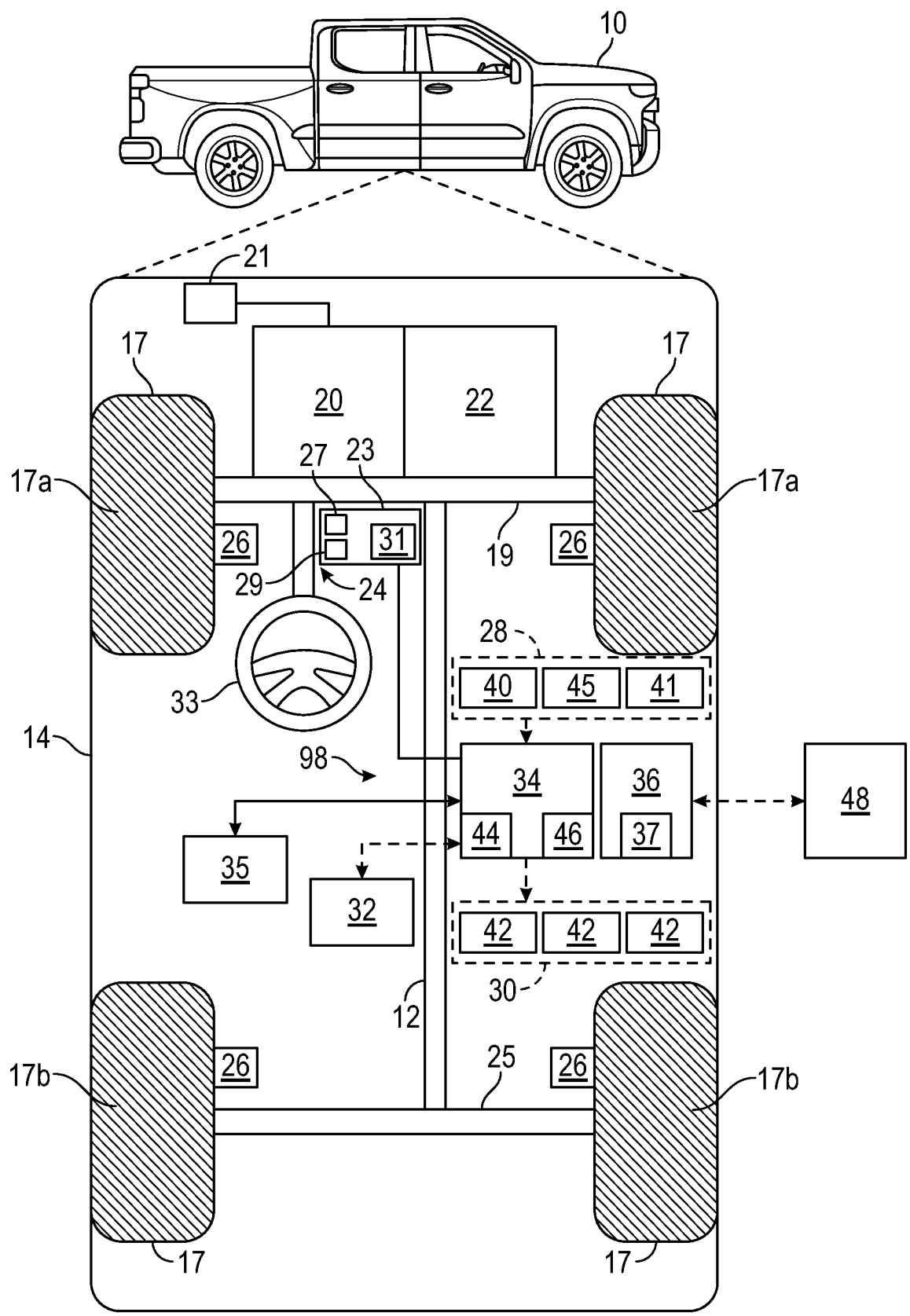
FIG. 1 is a block diagram depicting an embodiment of a vehicle including a system for low visibility driving.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 generally includes a chassis 12, a body 14, front and rear wheels 17 and may be referred to as a vehicle system. In the depicted embodiment, the vehicle 10 includes two front wheels 17a and two rear wheels 17b. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14. The vehicle 10 includes a front axle 19 coupled to the front wheels 17a and a rear axle 25 coupled to the rear wheels 17b.

In various embodiments, the vehicle 10 may be an autonomous vehicle, and a control system 98 is incorporated into the vehicle 10. The control system 98 may be referred to as the system or the system for low visibility driving using one or more displays 29, such as a multi-focal plane augmented reality display. The vehicle 10 is, for example, a vehicle that is automatically controlled to carry passengers from one location to another. The vehicle 10 is depicted in the illustrated embodiment as a pickup truck, but it should be appreciated that other vehicles including, trucks, sedans, coupes, sport utility vehicles (SUVs), recreational vehicles (RVs), etc., may also be used. In an embodiment, the vehicle 10 may be a so-called a Level Two, a Level Three, Level Four, or Level Five automation system. A Level Four system indicates "high automation," referring to the driving mode-specific performance by an automated driving system of aspects of the dynamic driving task, even if a human driver does not respond appropriately to a request to intervene. A Level Five system indicates "full automation," referring to the full-time performance by an automated driving system of aspects of the dynamic driving task under a number of roadway and environmental conditions that can be managed by a human driver. In Level 3 vehicles, the vehicle systems perform the entire dynamic driving task (DDT) within the area that it is designed to do so. The vehicle operator is only expected to be responsible for the DDT-fallback when the vehicle 10 essentially "asks" the driver to take over if something goes wrong or the vehicle is about to leave the zone where it is able to operate. In Level 2 vehicles, systems provide steering, brake/acceleration support, lane centering, and adaptive cruise control. However, even if these systems are activated, the vehicle operator at the wheel must be driving and constantly supervising the automated features.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the vehicle 10. The sensors 40 are in communication with the controller 34 and may include, but are not limited to, one or more radars, one or more light detection and ranging (lidar) sensors, one or more proximity sensors, one or more odometers, one or more ground penetrating radar (GPR) sensors, one or more steering angle sensors, Global Navigation Satellite System (GNSS) transceivers (e.g., one or more global positioning systems (GPS) transceivers), one or more tire pressure sensors, one or more front-view visible-light cameras 41, one or more gyroscopes, one or more accelerometers, one or more inclinometers, one or more speed sensors, one or more ultrasonic sensors, one or more inertial measurement units (IMUs) and/or other sensors. Each sensor 40 is configured to generate a signal that is indicative of the sensed observable conditions of the exterior environment and/or the interior environment of the vehicle 10. Because the sensor system 28 provides data to the controller 34, the sensor system 28 and its sensors 40 are considered sources of information (or simply sources).

The visible-light cameras 41 are configured to collect visible light and converts that to an electrical signal. Then, the visual-light cameras 41 organizes the information from the electric signal to render images and video streams. The visible-light cameras 41 utilize wavelengths of light from 380 nanometers to 700 nanometers, which is the same spectrum that the human eye perceives, and create images that replicate human vision, capturing light in red, green and blue wavelengths (RGB). Accordingly, in the present disclosure, the term "visible-light camera" means a camera configured to collect visible light and generate images and/or videos streams from the collected visible light. The term "visible light" means light having wavelengths from 380 nanometers to 700 nanometers. In certain embodiments, at least one of the visible-light cameras 41 is a front-view camera configured to capture images in front of the vehicle 10.

The sensor system 28 further one or more object-detecting sensors 45 configured to detect an object 47 in front of the vehicle 10. The term "object-detecting sensor" means a sensor specifically designed to detect objects, such as pedestrians and animals, in front of the vehicle 10 and excludes visible-light cameras. Therefore, the term "object-detecting sensor" does not refer to visible-light cameras. The object-detecting sensor 45 is configured to send sensor data to the controller 34. The sensor data generated by the object-detecting sensor 45 includes information about the object 47 in front of the vehicle 10. For example, the sensor data may include information about the size, shape, and moving direction of the object 47 in front of the vehicle 10. As non-limiting examples, the object-detecting sensor 45 may be or include one or more thermal imaging cameras, one or more night-vision devices, one or more radars, and/or one or more lidars. The thermal image camera is configured to generate a thermal image of an area in front of the vehicle 10. The night-vision device is configured to generate a night-vision image of an area in front of the vehicle 10. In the present disclosure, the term "night-vision device" means" an optoelectronic device that allows night-vision images to be produced in levels of light approaching total darkness. The term "night-vision image" is an image generated by the night-vision device 45 and converted to visible light from both visible light and near-infrared light. The near-infrared light refers to light with a wavelength from 800 nanometers to 2,500 nanometers.

The actuator system 30 includes one or more actuator devices 42 that control one or more vehicle features such as, but not limited to, the propulsion system 20, the transmission system 22, the steering system 24, and the brake system 26. In various embodiments, the vehicle features may further include interior and/or exterior vehicle features such as, but are not limited to, doors, a trunk, and cabin features such as air, music, lighting, etc.

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. The data storage device 32 may be part of the controller 34, separate from the controller 34, or part of the controller 34 and part of a separate system.

The vehicle 10 may further include one or more airbags 35 in communication with the controller 34 or another controller of the vehicle 10. The airbag 35 includes an inflatable bladder and is configured to transition between a stowed configuration and a deployed configuration to cushion the effects of an external force applied to the vehicle 10. The sensors 40 may include an airbag sensor, such as an IMU, configured to detect an external force and generate a signal indicative of the magnitude of such external force. The controller 34 is configured to command the airbag 35 to deploy based on the signal from one or more sensors 40, such as the airbag sensor. Accordingly, the controller 34 is configured to determine when the airbag 35 has been deployed.

The controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The controller 34 of the vehicle 10 may be referred to as a vehicle controller and may be programmed to execute a method 100 (FIG. 16) as described in detail below.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the vehicle 10. In various embodiments, one or more instructions of the controller 34 are embodied in the control system 98.

The vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more displays 29, one or more microphones 31 and/or other devices suitable to provide a notification to the vehicle user of the vehicle 10. The user interface 23 is in electronic communication with the controller 34 and is configured to receive inputs by a user (e.g., a vehicle operator or a vehicle passenger). For example, the user interface 23 may include a touch screen and/or buttons configured to receive inputs from a vehicle user 11 (e.g., vehicle operator). Accordingly, the controller 34 is configured to receive inputs from the user via the user interface 23.

The vehicle 10 may include one or more displays 29 configured to display information to the vehicle user 11 (e.g., vehicle operator or passenger) and may be an augmented reality (AR) display or a hybrid AR display. In the present disclosure, the term "AR display" means a display that presents information to users, while still allowing sight of the outside world. In certain embodiments, the display 29 may be configured as a head-up display (HUD), and/or a full windshield display. Accordingly, the display 29 may be an AR HUD or a full windshield display. In an AR HUD, images are projected on a windshield 39 of the vehicle 10. As discussed below, the display 29 may be a multi-focal plane AR display to facilitate manipulation (e.g., size, location, and type) of the virtual images 50.

The communication system 36 is in communication with the controller 34 and is configured to wirelessly communicate information to and from other remote vehicles 48, such as but not limited to, other vehicles ("V2V" communication), infrastructure ("V2I" communication), remote systems at a remote call center (e.g., ON-STAR by GENERAL MOTORS) and/or personal electronic devices, such as a mobile phone. In the present disclosure, the term "remote vehicle" means a vehicle, such as a car, configured to transmit one or more signals to the vehicle 10 while not physically connected to the vehicle 10. In certain embodiments, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or communication transceivers 37 for receiving and/or transmitting signals, such as cooperative sensing messages (CSMs). The communication transceivers 37 may be considered sensors 40. The communication system 36 is configured to wirelessly communicate information between the vehicle 10 and another vehicle. Further, the communication system 36 is configured to wirelessly communicate information between the vehicle 10 and infrastructure or other vehicles.

Figure 2:
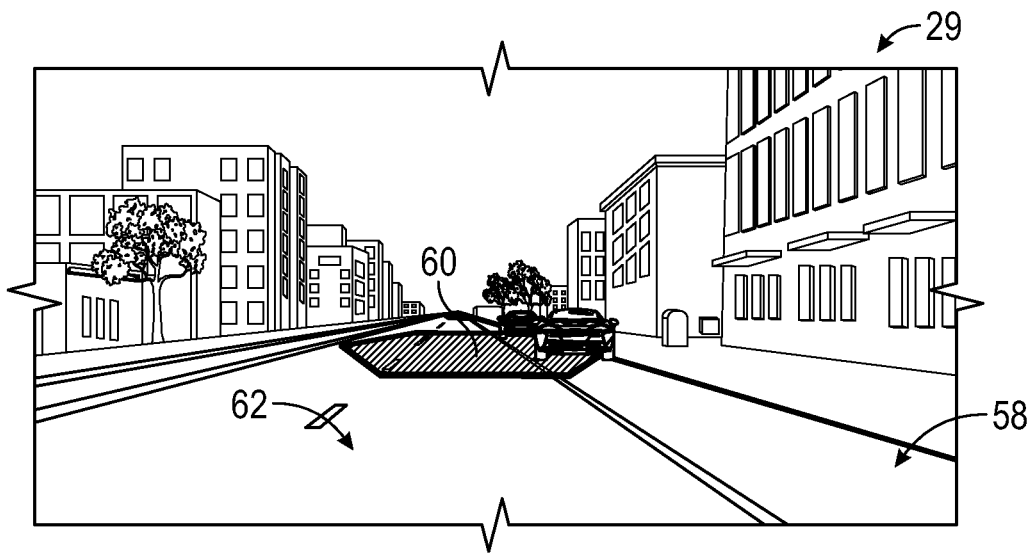
FIG. 2 is a schematic front view of the multi-focal plane augmented reality display of the vehicle of FIG. 1, highlighting a second image plane of the multi-focal plane augmented reality display of the vehicle of FIG. 1.
Figure 3:
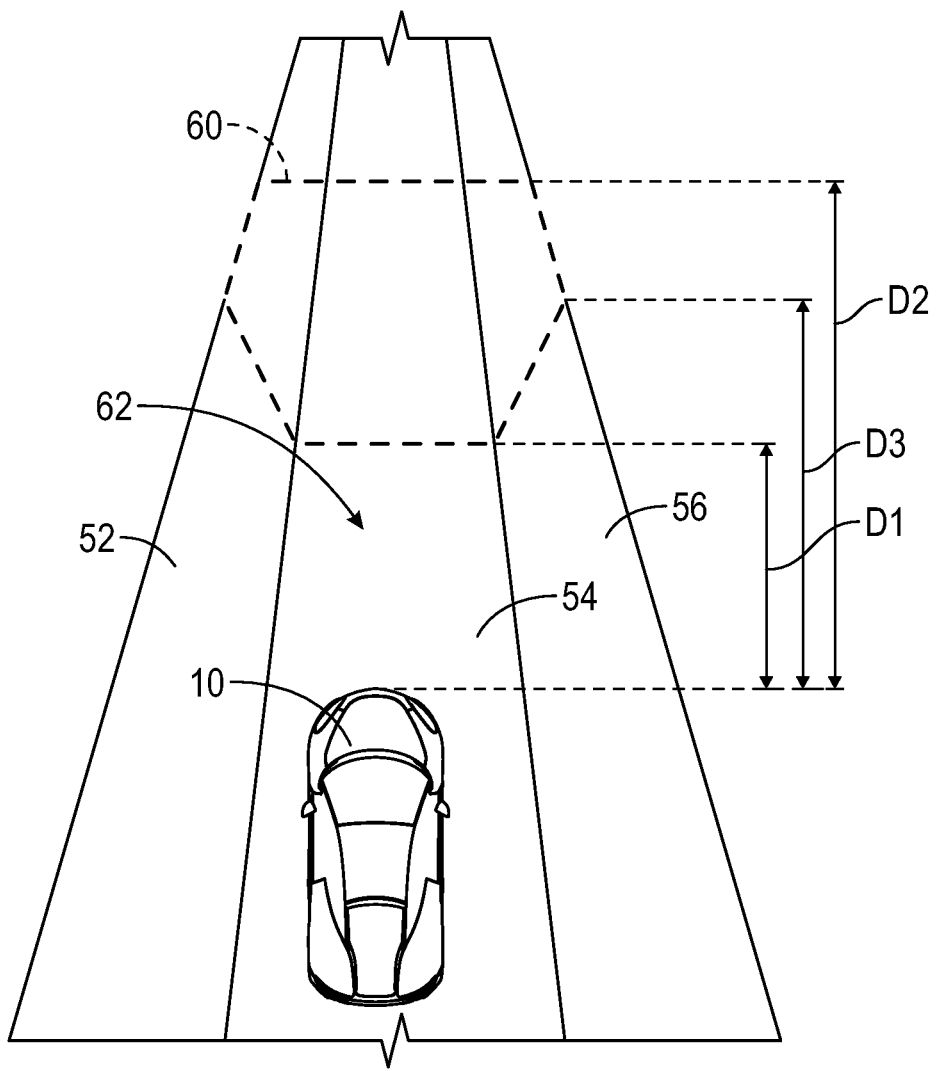
FIG. 3 is a schematic diagram of the second image plane of the multi-focal plane augmented reality display of FIG. 1.

With reference to FIGS. 2 and 3, the display 29 may be a multi-focal plane AR display as mentioned above. In this case, the display 29 has a first image plane 58 and a second image plane 60. The first image plane 58 shows the view of the outside world, and the second image plane 60 is reserved for displaying the virtual images 50 (FIG. 7). The second image plane 60 spans multiple lanes and the virtual images 50 appear at a location farther on the roadway surface 62 relative to the first image plane 58. For instance, as shown in FIG. 14, the second image plane 60 covers the left lane 52, the central lane 54, and the right lane 56. As a non-limiting example, in the central lane 54, the second image plane 60 starts at a first predetermined distance D1 (e.g., twenty-five meters) from the vehicle 10 and ends at a second predetermined distance D2 (e.g., ninety meters) from the vehicle 10. Regardless of the specific distances, the second predetermined distance D2 is greater than the first predetermined distance D1 to help the vehicle user 11 see the virtual images 50 (FIG. 7). In the left lane 52 and the right lane 56, the second image plane 60 is delimited by a sloped boundary that starts at the first predetermined distance D1 from the vehicle 10 and ends at a third predetermined distance D3 (e.g., fifty meters) from the vehicle 10. The third predetermined distance D3 is greater than the first predetermined distance D1 and less than the second predetermined distance D2 to help the vehicle user 11 (FIG. 6) see the virtual images 50 (FIG. 7). As used herein, the term "multi-focal plane AR display" means an AR display that presents images in more than one image plane, wherein the image planes are at different locations. It is desirable to use a multi-focal plane AR display in the presently disclosed system 98 to easily change the size, type, and/or location of the virtual images 50 with respect to the view of the outside world.

Figure 4:
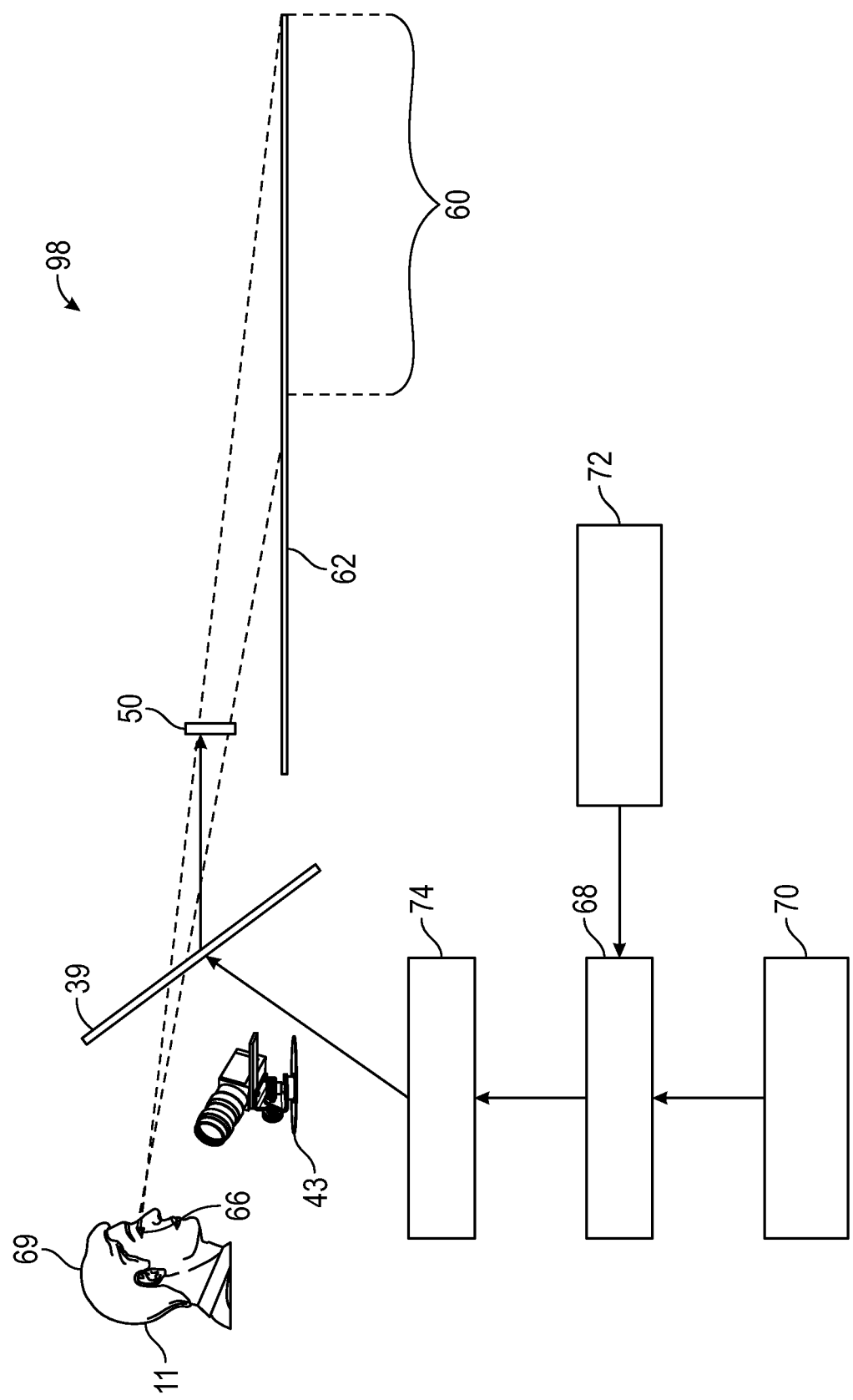
FIG. 4 is a schematic diagram of part of the system for displaying information on the multi-focal plane augmented reality display of the vehicle of FIG. 1.

With reference to FIG. 4, the system 98 includes a user tracker 43 (e.g., eye tracker and/or head tracker) configured to track the position and movement of the eyes 66 and/or the head 69 of the vehicle user 11. In the depicted embodiment, the user tracker 43 may be configured as one or more of cameras 41 of the vehicle 10. As discussed above, the cameras 41 are considered sensors 40 of the vehicle 10. As a sensor 40, the user tracker 43 is in communication with the controller 34, which includes a system manager 68. During operation of the system 98, the system manager 68 receives at least a first input 70 and a second input 72. The first input 70 is indicative of the position of the vehicle in space (i.e., the vehicle location in space), and the second input 72 is indicative of the vehicle user position in the vehicle 10 (e.g., the position of the eyes 66 and/or the head 69 of the vehicle user 11 in the vehicle 10). The first input 70 may include data such as GNSS data (e.g., GPS data), vehicle speed roadway curvature, and vehicle steering, and this data may be collected from the sensors 40 of the vehicle 10 and/or other remote vehicles 48 through the communication system 36 of the vehicle 10. The second input 72 may be received from the user tracker (e.g., eye tracker and/or head tracker). The system manager 68 is configured to determine (e.g., compute) the type, size, shape, and color of the conformal graphics (i.e., virtual images 50) based on the first input 70 (i.e., the vehicle location in space), the second input 72 (e.g., the position of the eyes and/or head of the user in the vehicle 10), and the sensed vehicle driving environment (which may be obtained through the sensors 40). The type, size, shape, and color of the conformal graphics of the virtual image 50 may be collectively referred to as the virtual image characteristics.

With continued reference to FIG. 4, the system 98 further includes an image engine 74, which is part of the display 29, and may be an integrated circuit configured to generate the virtual images 50. These generated virtual images 50 are then projected on the windshield 39 (if the display 29 is a HUD) to show the virtual images 50 on the second image plane 60 along the roadway surface 62.

Figure 5:
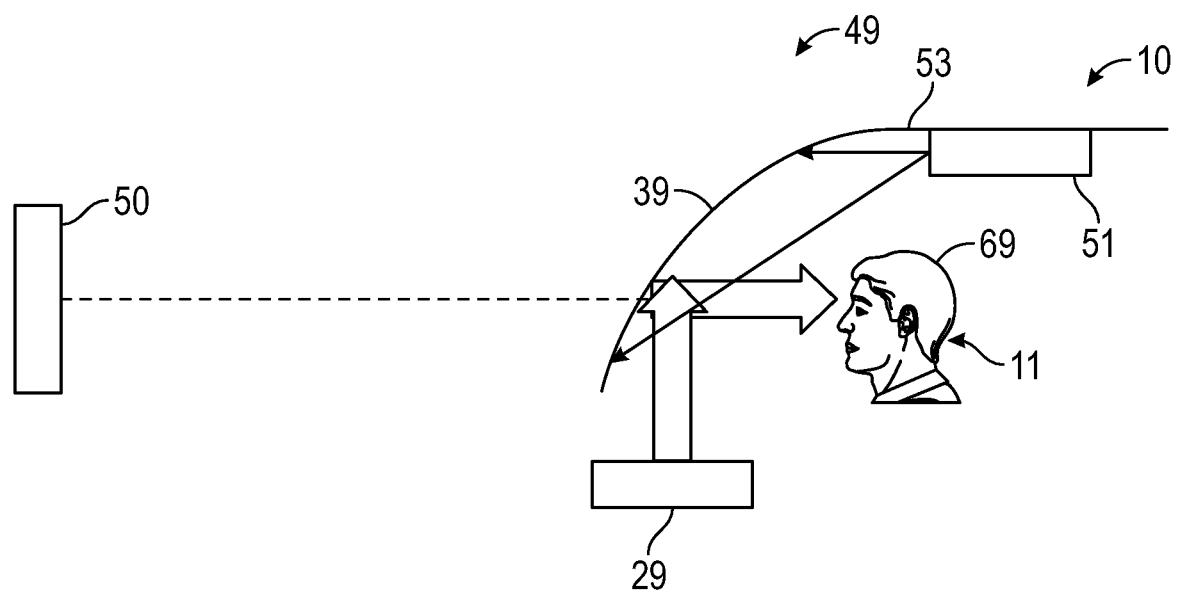
FIG. 5 is a schematic diagram of a hybrid augmented reality display system of the vehicle of FIG. 1.
Figure 6:
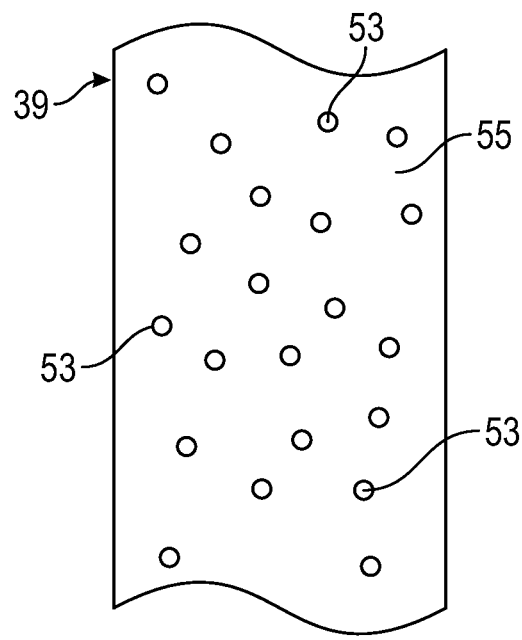
FIG. 6 is a schematic side view of the windshield of the hybrid augmented reality display system of FIG. 5.
Figure 7:
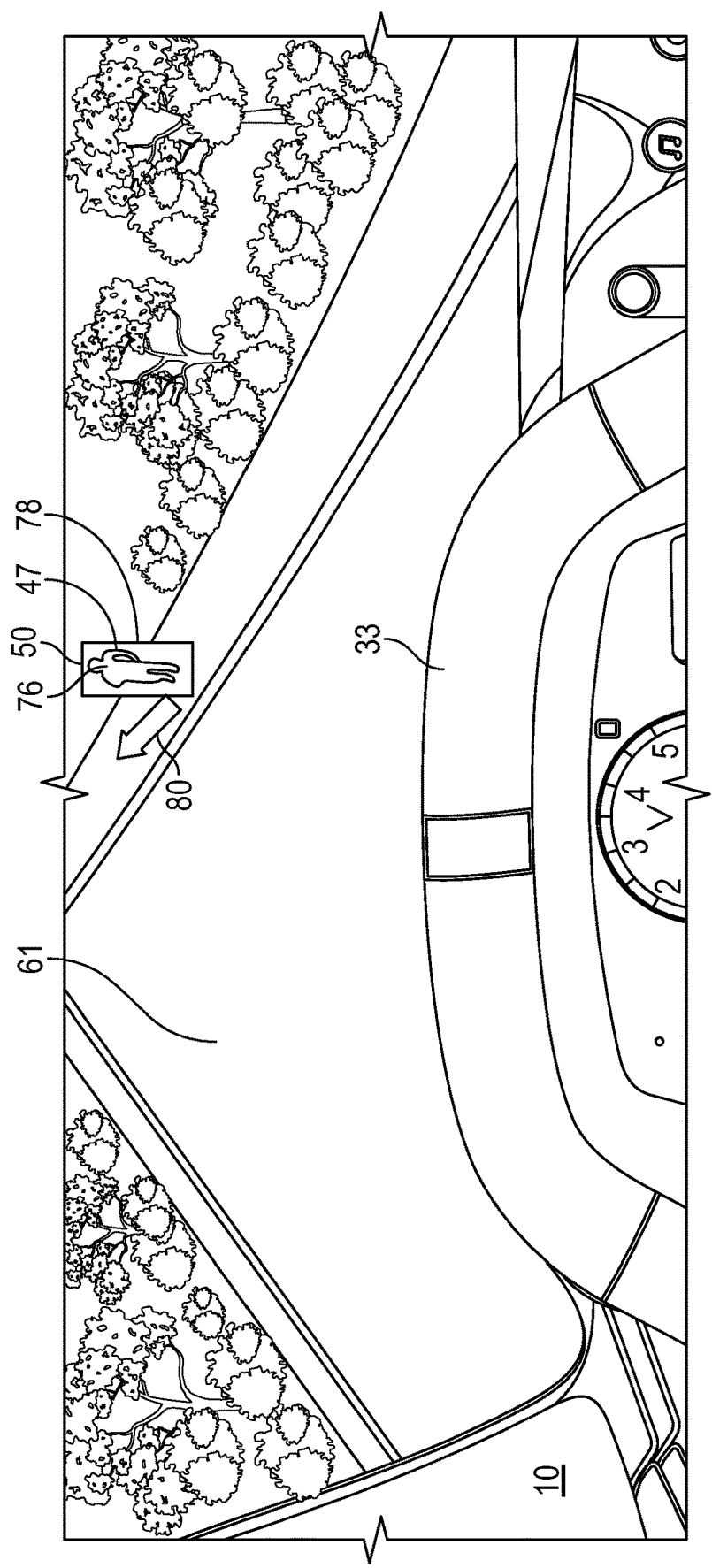
FIG. 7 is a schematic front view of part of the vehicle of FIG. 1, showing a virtual image presented by the display of the vehicle.

With reference to FIGS. 5 and 6, the display 29 may be part of a hybrid AR HUD system 49. In the hybrid AR HUD system 49, the display 29 is configured as an AR HUD and projects images on the windshield 39 of the vehicle 10. As discussed below, the display 29 may be a multi-focal plane AR display to facilitate manipulation (e.g., size, location, and type) of the virtual images 50. In addition to the AR HUD, the hybrid AR HUD system 49 includes RGB phosphors 53 embedded in the windshield 39. The windshield 39 may be wholly or partly made of polyvinyl butyral, and the RGB phosphors 53 may be embedded in random places in the windshield 39. Accordingly, the windshield 39 may include a polyvinyl butyral layer 55 and RGB phosphors 53 embedded in the polyvinyl butyral layer 55. The hybrid AR HUD system 49 may further include a projector 51, such as a Pico projector, attached to the headliner of the vehicle 10. The projector 51 is configured to emit a violet or ultraviolet laser to excite RGB phosphors 53 embedded in the polyvinyl butyral layer 55 of the windshield 39. Therefore, the lasers projected from the projector 51 are specifically designed to excite the RGB phosphors 53 embedded in the polyvinyl butyral layer 55 of the windshield 39. As a result, a laser induced fluorescence will occur for every irradiated spot of the windshield 39. The projector 51 may have a wide throw angle. Photons are born at the phosphor location, and, for this reason, the image distance is at the windshield plane. The images generated by the AR HUD display 29 and the excited RGB phosphors may overlap.

With reference to FIGS. 1 and 7, the system 98 is configured to command the display 29, such as an AR HUD, to present virtual images 50 to detect the presence and identify the location of one or more objects 47 (e.g., animals or pedestrians) that are not evident to the vehicle user 11 during low visibility conditions (e.g., fog, rain, snow, and at night). In doing so, the display 29 shows information in a contextual manner by augmenting the road scene with conformal graphics. In the present disclosure, the term "conformal graphic" means synthetic generated content (i.e., a virtual image 50) presented as part of the outside world. Accordingly, the display 29 is a conformal display. In the present disclosure, the term "conformal display" means a display that can represent synthetically generated content (i.e., one or more virtual images 50) as part of the outside world. Based on real-time vehicle sensing from the sensors 40, the display 29 presents the vehicle user 11 with a visual indicator (i.e., the virtual image 50) of the presence and real-time location of the objects 47 (e.g., pedestrians and/or animals) using the display 29 (e.g., AR HUD). The system 98 of the vehicle 10 perceives the road ahead using one or more object-detecting sensors 45 as well as one or more visible-light cameras 41. The sensor data from the object-detecting sensors 45 (e.g., night-vision device, thermal imaging sensor, lidar, and/or radar) is used to determine the three-dimensional location of the detected object 47 (e.g., pedestrian and/or animal). Further, the sensor data is used in real time to draw a highlighted area (e.g., virtual image 50) to indicate the real-time location of the object 47 in the driving scene.

With continued reference to FIGS. 1 and 7, computer vision and machine learning are used to classify the object 47 in front of the vehicle 10. When the object-detecting sensors 45 detects an object 47 in front of the vehicle 10 that is not detected by the visible-light cameras 41, the system 98 commands the display 29 to present a graphic indicator (i.e., virtual image 50) along with a cropped and integrated live video presentation (i.e., the cropped live image 76) of the object 47 at the real location in the road scene. For example, the thermal video image and/or the night-vision video is cropped to only contain the identified object 47. The video image may be colorized (e.g., red, yellow, green, etc.) to denote criticality of the object 47 path coinciding with the vehicle path. The cropped video image is then projected by the display 29 (e.g., AR HUD) and highlighted with a graphic (i.e., virtual image 50). By using virtual images 50, the system 98 provides enhanced situation awareness of objects 47 that are not evident in low visibility conditions. As a non-limiting example, the virtual image 50 may include a rectangle 78 surrounding the entire cropped image 76 of the object 47 and arrow 80 adjacent to the rectangle 78 to highlight the object 47. The rectangle 78 highlights the cropped image 76 of the object 47 and the arrow 80 indicates the moving direction of the object 47 in front of the vehicle 10. In other words, graphic elements, such as arrows 80 and/or colors, are used to provide additional information about the speed, trajectory, and critical nature of the detected object 47. In vehicles 10 with the hybrid AR HUD system 49, the bounding box (i.e., rectangle 78) is shown without the cropped live image 76 when the object 47 is outside the field-of-view of the display 29 (AR HUD). In vehicles 10 with the hybrid AR HUD system 49, the bounding box (i.e., rectangle 78) and the real-time cropped video image 76 are shown when the object 47 is inside the field-of-view of the display 29 (AR HUD) for object identification.

Figure 8:
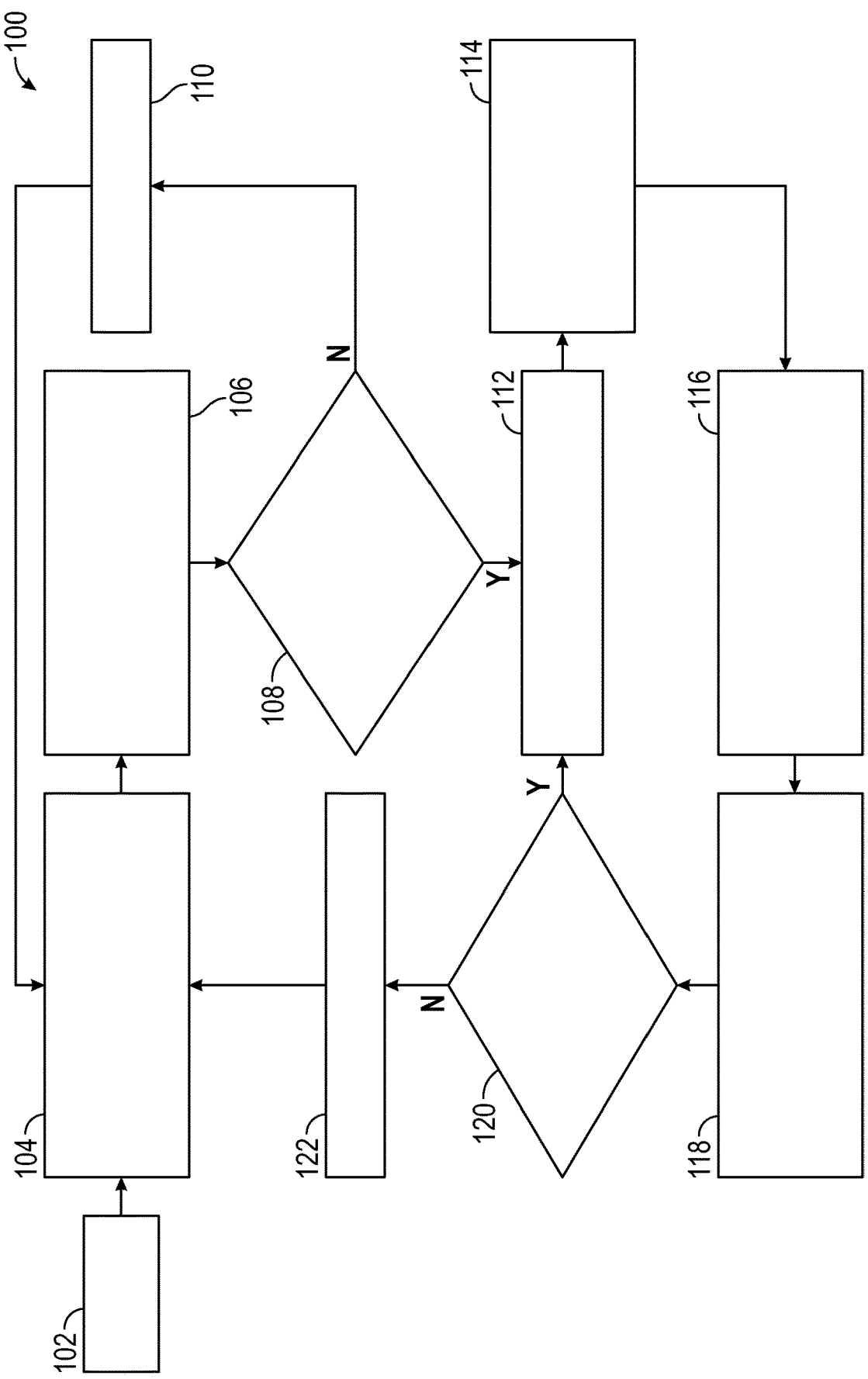
FIG. 8 is a flowchart for a method for low visibility driving.

FIG. 8 is a flowchart of the method 100 for low visibility driving using the display 29, such as the multi-focal plane augmented reality display and/or the hybrid AR HUD system 49. The method 100 begins at block 102, in which the controller 34 determines that the vehicle 10 is being driven using, for example, signals generated by the sensors 40. For example, the controller 34 may receive data from one of the sensors 40, such as a speed sensor, to determine that the vehicle 10 is moving. Then, the method 100 proceeds to block 104.

At block 104, the object-detecting sensors 45 (e.g., night-vision device, thermal imaging sensor, lidar, and/or radar) and the visible-light cameras 41 scan the roadway 61 (FIG. 7) in front of the vehicle 10. In response, the object-detecting sensors 45 and the front-view visible-light cameras 41 send sensor data and image data, respectively, to the controller 34. The image data includes one or more images of the roadway 61 in front of the vehicle 10 and may include information about one or more objects 47 in front of the vehicle 10. The controller 34 therefore receives image data from the visible-light camera 41 and sensor data from the object-detecting sensors 45. The sensor data includes information about objects 47 in front of the vehicle 10, such as the location, trajectory, heading, and movement direction of the object 47. Then, the method 100 continues to block 106.

At block 106, the controller 34 identifies (i.e., detects) and classifies one or more objects 47 of interest in front of the vehicle 10 using the sensor data from one or more object-detecting sensors 45 and/or the image data from the visible-light cameras 41. Computer vision may be used to identify and classify one or more objects in front of the vehicle 10. Machine learning may be used to classify the objects 47 in front of the vehicle 10. Next, the method 100 proceeds to block 108.

At block 108, the controller 34 determines whether one or more visible-light cameras 41 are unable to detect the object 47 in front of the vehicle 10 that was detected by one or more of the object-detecting sensors 45. If one or more visible-light cameras 41 detect the object 47 in front of the vehicle 10 that was detected by one or more object-detecting sensors 45, then the method 100 proceeds to block 110. To determine whether one or more visible-light cameras 41 are unable to detect the object 47 in front of the vehicle 10 that was detected by one or more of the object-detecting sensors 45, the controller 34 first determines the confidence level that the visible-light camera detected the object 47 in front of the vehicle 10 that was detected by one or more of the object-detecting sensors 45. Then, the controller 34 compares this confidence level with a predetermined threshold, which may be determined via testing. If the confidence level that the visible-light camera detected the object 47 in front of the vehicle 10 that was detected by one or more of the object-detecting sensors 45 is greater than the predetermined threshold, then the controller 34 determines that the visible-light cameras 41 can detect the object 47 in front of the vehicle 10 that was detected by one or more of the object-detecting sensors 45. In response to determining that the visible-light cameras 41 can detect the object 47 in front of the vehicle 10 that was detected by one or more of the object-detecting sensors 45, the method 100 continues to block 110.

At block 110, the controller 34 does not execute an action. Therefore, the display 29 refrains from generating the virtual image 50 that identify and highlight the object 47 detected by the object-detecting sensors 45. After block 110, the method 100 returns to block 104.

At block 108, if the confidence level that the visible-light camera detected the object 47 in front of the vehicle 10 that was detected by one or more of the object-detecting sensors 45 is equal to or less than the predetermined threshold, then the controller 34 determines that the visible-light cameras 41 are unable to detect the object 47 in front of the vehicle 10 that was detected by one or more of the object-detecting sensors 45 and the method 100 proceeds to block 112.

At block 112, the controller 34 determines the proper highlighting and virtual image 50 to present in the display 29. In other words, the controller 34 determines the virtual image 50 or virtual images 50 that should be displayed based on the movements, location, headway, and trajectory of the object 47 and the location of the vehicle 10 relative to the object 47. For example, if the object 47 in front of the vehicle 10 is moving, the controller 34 may determine the direction of the movement and determine that an arrow 80 should be added adjacent to the rectangle 78 to indicative the direction of movement of the object 47. Next, the method 100 continues to block 114.

At block 114, the controller 34 determines, in real time, the location of the eyes 66 and/or the head 69 of the user of the vehicle 10 using at least one input from the user tracker 43. As discussed above, the user tracker 43 may be a camera 41 configured to track the movements of the head 69 and/or the eyes 66 of the vehicle user. The controller 34 then uses the inputs from the user tracker 43 to continuously determine, in real time, the location of the eyes 66 and/or the head 69 of the user of the vehicle 10. Also, at block 114, the controller 34 determines, in real time, the location of the object 47 detected by the object-detecting sensors 45 using the sensor data. The method 100 then proceeds to block 116.

At block 116, the controller 34 determines, in real time, the location, type, size, shape, and color of the virtual image 50 to be displayed on the display 29 (e.g., the multi-focal plane AR HUD display or hybrid AR HUD system 49) based on the location of the eyes 66 and/or the head 69 of the vehicle user 11 of the vehicle 10 and/or the location of the vehicle 10 relative to the location of the object 47. As a non-limiting example, the location of the virtual image 50 in the display 29 may change as the vehicle user 11 moves the head 69 and/or eyes 66. Further, the size of the virtual images 50 may increase as the object 47 gets closer to the vehicle 10. Next, the method 100 proceeds to block 118.

At block 118, the display 29 (e.g., an AR HUD or full windshield display) generates the virtual images 50 (e.g., graphics) and a cropped live image of the object 47 on the windshield 39. As discussed above, the object-detecting sensors 45 may be, for example, a night-vision devices and/or thermal imaging sensors (e.g., thermal imaging cameras). The thermal imaging sensors may be far-infrared (FIR) sensors. The far-infrared light refers to light with a wavelength from 8 micros to 14 microns (8k-14k nm). Alternatively, the thermal imaging sensors may be a near-infrared (NIR) sensors, short wave (SWIR) sensors, and/or a medium wave infrared (MWIR) sensors. The NIR sensors and the SWIR sensors are used in conjunction with illumination. The object-detecting sensor 45 may generate a night-vision image or a thermal image of the area (including the object 47) in front of the vehicle 10. The controller 34 may then crop the night-vision image and/or the thermal image of the area in front of the vehicle 10 to generate the cropped image 76 of the area in front of the vehicle 10. This cropped image (i.e., a cropped night-vision image and/or the cropped thermal image) solely includes an image of the object 47 in front of the vehicle 10 generated using the object-detecting sensors 45. The controller 34, as mentioned above, also generates virtual images 50. As a non-limiting example, the virtual images 50 may include a bound box (i.e., rectangle 78) surrounding the entire cropped image and an arrow 80 adjacent to the rectangle 78. The arrow 80 indicates the direction of movement of the object 47 (e.g., pedestrian and/or animal). The controller 34 then commands the display 29 to present the virtual image 50 on the windshield 39 at the location previously determined at block 116 in order to identify and highlight the object 47 in front of the vehicle 10. Then, the method 100 proceeds to block 120.

At block 120, the controller 34 compares the confidence level that the visible-light camera 41 detected the object 47 in front of the vehicle 10 that was detected by one or more of the object-detecting sensors 45. If the confidence level that the visible-light camera 41 detected the object 47 in front of the vehicle 10 that was detected by one or more of the object-detecting sensors 45 is greater than the predetermined threshold, then the method 100 continues to block 122. At block 122, the controller 34 commands the display 29 to stop displaying the virtual images 50 and the cropped images 76. Then, the method 100 returns to block 104. If the confidence level that the visible-light camera 41 detected the object 47 in front of the vehicle 10 that was detected by one or more of the object-detecting sensors 45 is equal to or less than the predetermined threshold, the method 100 returns to block 112.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for low visibility driving, comprising;
receiving image data from a visible-light camera, wherein the image data includes an image of an area in front of a vehicle;
receiving sensor data from an object-detecting sensor, wherein the object-detecting sensor is configured to detect an object in front of the vehicle, and the sensor data includes information about the object in front of the vehicle;
detecting the object in front of the vehicle using the sensor data received from the object-detecting sensor;
determining whether the visible-light camera is unable to detect the object in front of the vehicle that was detected by the object-detecting sensor; and
in response to determining that the visible-light camera is unable to detect the object in front of the vehicle that was detected by the object-detecting sensor, commanding a display of the vehicle to generate a virtual image using the sensor data to identify the object in front of the vehicle, wherein the display is a multi-focal augmented reality (AR) display of the vehicle, the multi-focal AR display has a first image plane and a second image plane, the first image plane and the second image planes are at different locations, the first image plane shows a view of an outside world, a second image plane is reserved for displaying the virtual image, and the second image plane appears at a location farther on a roadway surface relative to the first image plane while the vehicle travels along the roadway surface, the second image plane starts at a first predetermined distance from the vehicle and ends at a second predetermined distance, the second predetermined distance is greater than the first predetermined distance, the second image plane includes a first linear boundary arranged horizontally relative to the roadway, the first linear boundary is at the first predetermined distance from the vehicle, the second image plane is delimited by a sloped linear boundary that starts at the first predetermined distance from the vehicle and ends at a third predetermined distance from the vehicle, the sloped linear boundary is obliquely angled relative to the first linear boundary, the third predetermined distance is greater than the first predetermined distance, the third predetermined distance is less than the second predetermined distance, and the second image plane includes a second linear boundary that is arranged parallel to the roadway, the slopped linear boundary is obliquely angled relative to the second linear boundary, and the second linear boundary starts at the third predetermined distance from the vehicle and ends at the second predetermined distance from the vehicle.

2. The method of claim 1, wherein determining whether the visible-light camera is unable to detect the object in front of the vehicle includes:
determining a confidence level that the visible-light camera detected the object in front of the vehicle that was detected by the object-detecting sensor;
comparing the confidence level with a predetermined threshold to determine whether the confidence level is equal to or less than the predetermined threshold; and
in response to determining that the confidence level is equal to or less than the predetermined threshold, commanding the display to generate the virtual image using the sensor data received from the object-detecting sensor to identify the object in front of the vehicle.

3. The method of claim 2, further comprising, in response to determining that the confidence level is greater than the predetermined threshold, refraining from generating the virtual image to identify the object in front of the vehicle, the first predetermined distance is twenty-five meters, the second predetermined distance is ninety meters, and the third predetermined distance is fifty meters, the slopped linear boundary is directly connected to the first linear boundary, and the slopped linear boundary is directed connected to the second linear boundary.

4. The method of claim 1, wherein, the object-detecting sensor is a thermal imaging camera configured to generate a thermal image of the area in front of the vehicle, the method further comprising cropping the thermal image of the area in front of the vehicle to generate a cropped thermal image, the method further comprises commanding the display to present the cropped thermal image, and the cropped thermal image solely includes a thermal image of the object in front of the vehicle.

5. The method of claim 4, wherein the virtual image includes a rectangle surrounding an entirety of the cropped thermal image.

6. The method of claim 5, wherein the virtual image further includes an arrow adjacent to the rectangle to indicate a moving direction of the object in front of the vehicle.

7. The method of claim 1, wherein the object-detecting sensor is a night-vision device configured to generate a night-vision image of the area in front of the vehicle, the method further comprising cropping the night-vision image of the area in front of the vehicle to generate a cropped night-vision image, the method further comprises commanding the display to present the cropped night-vision image, the cropped night-vision image solely includes a night-vision image of the object in front of the vehicle, the virtual image includes a rectangle surrounding an entirety of the cropped night-vision image, and the virtual image includes an arrow adjacent to the rectangle to indicate a moving direction of the object in front of the vehicle.

8. The method of claim 7, further comprising:
determining a location of eyes of a vehicle operator of the vehicle;
determining a location of the object in front of the vehicle; and
determining a location of the virtual image based on the location of the eyes of the vehicle operator and the location of the object in front of the vehicle.

9. The method of claim 8, wherein commanding the display to generate the virtual image to identify the object in front of the vehicle includes generating the virtual image at the previously determined location of the virtual image.

10. The method of claim 9, wherein the display is an augmented reality head-up display.

11. The method of claim 9, wherein the display is part of a hybrid augmented reality (AR) head-up display (HUD) system, the vehicle includes a windshield, the windshield includes a polyvinyl butyral layer and RGB phosphors embedded in the polyvinyl butyral layer of the windshield, and the hybrid AR HUD system includes a projector configured to emit a laser toward the windshield to cause fluorescence of the RGB phosphors.

12. A vehicle, comprising:
a display;
a plurality of sensors, wherein the plurality of sensors includes a visible-light camera and an object-detecting sensor, and the object-detecting sensor is configured to detect an object in front of the vehicle;
a controller in communication with the plurality of sensors and the display, wherein the controller is programmed to:
receive image data from the visible-light camera, wherein the image data includes an image of an area in front of the vehicle;
receive sensor data from the object-detecting sensor, wherein the sensor data includes information about the object in front of the vehicle;
detect the object in front of the vehicle using the sensor data received from the object-detecting sensor;
determine whether the visible-light camera is unable to detect the object in front of the vehicle that was detected by the object-detecting sensor; and
in response to determining that the visible-light camera is unable to detect the object in front of the vehicle that was detected by the object-detecting sensor, command the display to generate a virtual image using the sensor data to identify the object in front of the vehicle, wherein the display is a multi-focal augmented reality (AR) display of the vehicle, the multi-focal AR display has a first image plane and a second image plane, the first image plane and the second image planes are at different locations, the first image plane shows a view of an outside world, a second image plane is reserved for displaying the virtual image, and the second image plane appears at a location farther on a roadway surface relative to the first image plane while the vehicle travels along the roadway surface, the second image plane starts at a first predetermined distance from the vehicle and ends at a second predetermined distance, the second predetermined distance is greater than the first predetermined distance, the second image plane includes a first linear boundary arranged horizontally relative to the roadway, the first linear boundary is at the first predetermined distance from the vehicle, the second image plane is delimited by a sloped linear boundary that starts at the first predetermined distance from the vehicle and ends at a third predetermined distance from the vehicle, the sloped linear boundary is obliquely angled relative to the first linear boundary, the third predetermined distance is greater than the first predetermined distance, the third predetermined distance is less than the second predetermined distance, and the second image plane includes a second linear boundary that is arranged parallel to the roadway, the slopped linear boundary is obliquely angled relative to the second linear boundary, and the second linear boundary starts at the third predetermined distance from the vehicle and ends at the second predetermined distance from the vehicle.

13. The vehicle of claim 12, wherein the controller is programmed to:
determine a confidence level that the visible-light camera detected the object in front of the vehicle that was detected by the object-detecting sensor;
compare the confidence level with a predetermined threshold to determine whether the confidence level is equal to or less than the predetermined threshold; and
in response to determining that the confidence level is equal to or less than the predetermined threshold, command the display to generate the virtual image using the sensor data received from the object-detecting sensor to identify the object in front of the vehicle.

14. The vehicle of claim 13, wherein the controller is programmed to, in response to determining that the confidence level is greater than the predetermined threshold, refrain from commanding the display to generate the virtual image to identify the object in front of the vehicle.

15. The vehicle of claim 12, wherein the object-detecting sensor is a thermal imaging camera configured to generate a thermal image of the area in front of the vehicle, and the controller is configured to crop the thermal image of the area in front of the vehicle to generate a cropped thermal image, the controller is programmed to command the display to present the cropped thermal image, and the cropped thermal image solely includes a thermal image of the object in front of the vehicle.

16. The vehicle of claim 15, wherein the virtual image includes a rectangle surrounding an entirety of the cropped thermal image.

17. The vehicle of claim 16, wherein the virtual image further includes an arrow adjacent to the rectangle to indicate a moving direction of the object in front of the vehicle.

18. The vehicle of claim 12, wherein the object-detecting sensor is a night-vision device configured to generate a night-vision image of the area in front of the vehicle, the controller is configured to crop the night-vision image of the area in front of the vehicle to generate a cropped night-vision image, the controller is programmed to command the display to present the cropped night-vision image, and the cropped night-vision image solely includes a night-vision image of the object in front of the vehicle, the virtual image includes a rectangle surrounding an entirety of the cropped night-vision image, and the virtual image includes an arrow adjacent to the rectangle to indicate a moving direction of the object in front of the vehicle, the first predetermined distance is twenty-five meters, the second predetermined distance is ninety meters, and the third predetermined distance is fifty meters, the slopped linear boundary is directly connected to the first linear boundary, and the slopped linear boundary is directed connected to the second linear boundary.

19. The vehicle of claim 18, wherein the controller is programmed to:
   determine a location of eyes of a vehicle operator of the vehicle;
   determine a location of the object in front of the vehicle; and
   determine a location of the virtual image based on the location of the eyes of the vehicle operator and the location of the object in front of the vehicle.

20. The vehicle of claim 19, wherein the controller is configured to command the display to generate the virtual image at the previously determined location of the virtual image.

\* \* \* \* \*